Dec. 12, 1933.   G. A. BEISWENGER   1,939,382
DISTILLATION APPARATUS
Filed Nov. 20, 1928
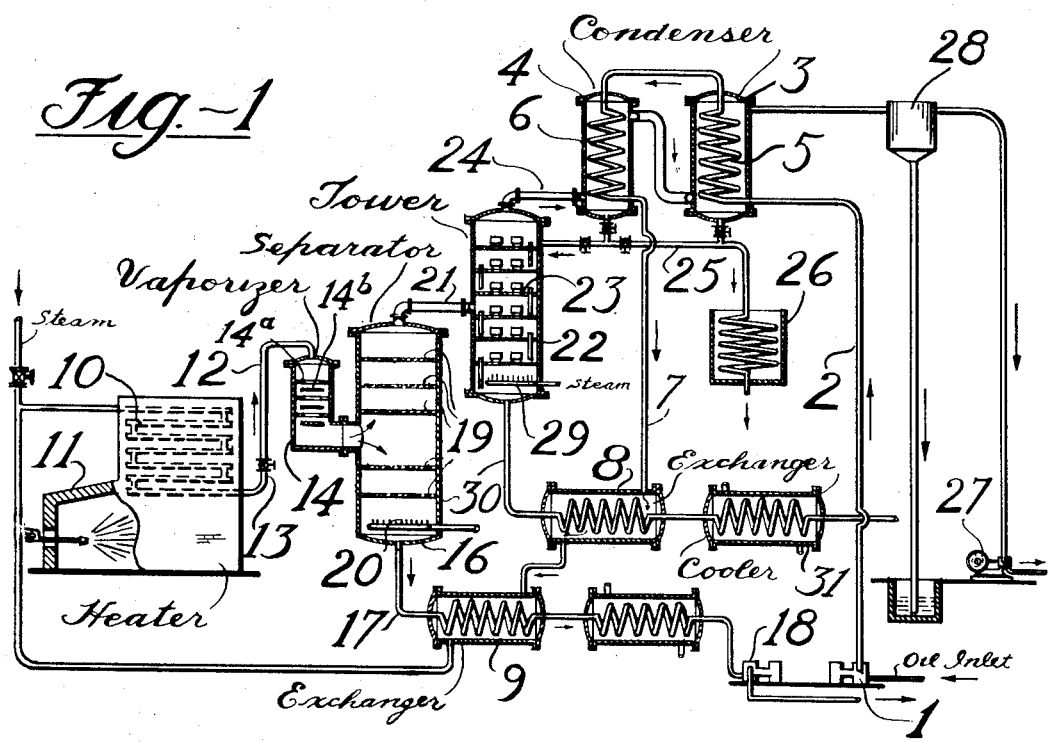
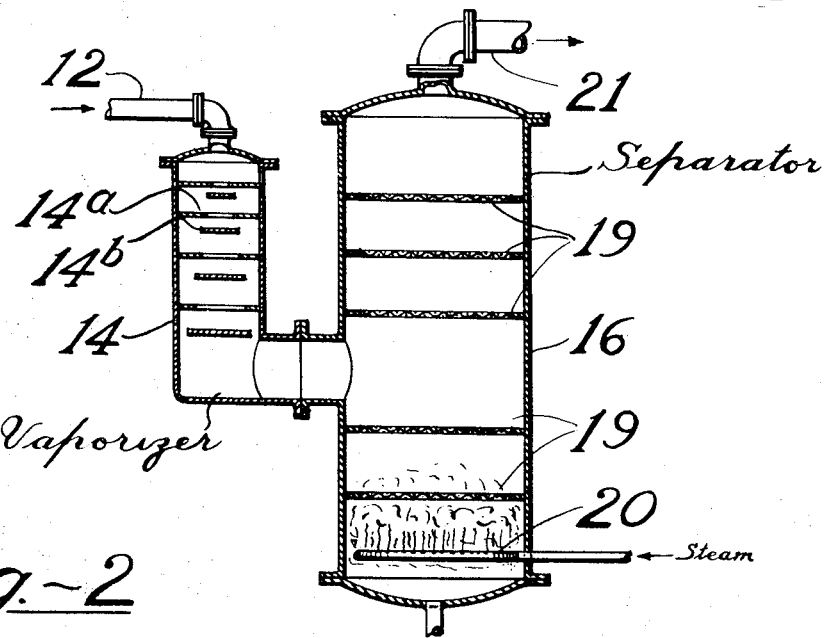
Inventor
GUSTAV A. BEISWENGER
By his Attorney

UNITED STATES PATENT OFFICE 1,939,382

DISTILLATION APPARATUS

Gustav A. Beiswenger, Elizabeth, N. J., assignor to Standard Oil Development Company, a corporation of Delaware Application November 20, 1928
Serial No. 320,550

2 Claims. (Cl. 196—82)

The present invention relates to the art of distilling hydrocarbon oils and the like and more specifically comprises an improved process and apparatus for distilling tarry oils, whereby the quality of the distillates is greatly improved. My process and apparatus will be fully understood from the following description and the drawing.

In the drawing, Fig. 1 is a semi-diagrammatic view in sectional elevation of an apparatus constructed according to my invention and indicates the flow of oil.

Fig. 2 is an enlarged view of a portion of the apparatus in which vaporization of the liquid occurs.

Referring to the drawing, Fig. 1, reference character 1 denotes a feed pump which draws oil, which may be crude oil, reduced crude or the like, from any convenient source (not shown) and forces it through a pipe 2 to vapor condensers 3 and 4. The oil flows through coils 5 and 6 respectively for preheat and may then pass by line 7 to exchangers 8 and 9 for further preheat, as will be understood.

Preheated oil then flows through a suitable heater which may be in the form of a coil or series of connected tubes 10 arranged in a suitably fired furnace setting 11. The oil leaves the the tubes 10 at a vaporizing temperature. The heated oil then flows through a discharge pipe 12 which is fitted with a valve 13 to a vaporizer 14 and thence to suitable apparatus for separating vapor and liquid.

The vaporizer is preferably in the form of a pipe of enlarged cross-section fitted with baffles. The vaporizer is most suitably in a vertical position, being fed at the upper end by pipe 12 and discharging directly by the lower end into the separation equipment. The baffles may be satisfactorily made in the form of alternate annular rings 14a which may be sealed around their outer circumference to the inside of shell 14, and discs 14b, which may be spaced concentrically with the shell. I have found it desirable to space the baffles closer together at the upper part of shell 14. The preferred arrangement of baffles can best be seen in Fig. 2. It will be understood that the number of baffles may be varied. Twenty or more, for example, may be used.

Any preferred type of separation equipment may be used in connection with the vaporizer, for example a single tower, with or without rectification means, but I prefer a primary separator 16 from which tar may be withdrawn by pipe 17 to exchanger 9 and by pipe 18 to storage (not shown). The separator may be empty or fitted with screens or plates 19. A steam spray 20 is provided at the lower part.

Vapor flows from the primary separator 16 by vapor line 21 to a tower 22 which may be fitted with bell cap plates 23. Vapor line 24 conducts vapor from the top of tower 22 to condensers 4 and 3. Condensate from the condensers is withdrawn to a manifold 25 which is fitted with suitable valves, whereby a part of the condensate may be returned to tower 22 or the whole may be withdrawn through cooler 26 to storage (not shown). The separation equipment may be maintained under reduced pressure, if desired, and in that case uncondensed vapor from condenser 3 will be conducted to a vacuum pump 27 or first to a barometric condenser 28 if steam is used in the distillation.

Steam may be forced into the base of tower 22 by spray pipe 29 and the reflux condensate withdrawn by pipe 30 through exchanger 8, cooler 31 and to storage (not shown).

In the operation of pipe stills, I have found that the distillates are often badly colored, presumably by entrainment of tarry unvaporized oil and that once formed, the tarry mist is difficult to separate. However, by use of a vaporizer such as is described above, I have been able to produce distillates which are much improved in respect to color and appearance and which may be refined with less difficulty and with less loss. I have observed that the effect of the vaporizer is especially marked when there is a considerable difference in pressure between the heating coil and separator, or when the ratio of pressures before and after the separation is relatively large, for example, in vacuum distillation. The gradual expansion of the oil-vapor mixture from the higher to lower pressure, appears to substantially prevent contamination of distillates by entrainment, when the separation zone is operated at any reasonable vapor velocity; that is, any velocity at which mechanical entrainment is not detrimental. In general, the vaporization corresponding to the pressure and temperature prevailing, will have been substantially completed as the vapor-liquid mixture emerges into the separator.

As an example of the operation of my process, a 50% reduced Colombia crude residue is passed through a half-inch coil at a rate of about 60 gallons per hour and heated to about 622° F. The coil is maintained at a pressure above atmospheric and the oil-vapor mixture is gradually expanded through a vaporizer, about 6" diameter by 33" long, constructed as above described, into a separation tower in which a high vacuum is maintained. The distillate and tar bottom are separated, the latter being a 93° F. melting point pitch. The distillate has the following characteristics:

| | |
|---|---|
| Gravity | 23° A. P. I. |
| Flash | 290° F. |
| Viscosity | 225 sec. Saybolt at 100° F. |
| Color | 2½ Robinson |

As a comparative test, the same apparatus, omitting the vaporizer was run on the same feed but even by reducing the feed rate to 30 gallons per hour, no color better than ½ Robinson could be obtained, running of course for the same gravity and viscosity distillate.

My invention has been described particularly in relation to hydrocarbon oils and to distillation under reduced pressure, but it will be understood that my process and apparatus may be applied to the distillation of other substances where entrainment is undesirable and to distillation at atmospheric or higher pressures.

My invention is not to be limited by any theory of the action of my apparatus nor to any specific example of its construction or operations, but only by the following claims, in which I wish to claim all novelty inherent in the process and apparatus.

I claim:

1. Apparatus for distilling liquids, comprising a vaporizing chamber in the form of a vertical pipe of enlarged cross section, fitted with baffles spaced at increasing intervals from the inlet to the discharge end, a heating coil connected to the inlet end of the vaporizing chamber, and a separator connected by means of a single conduit to the discharge end of the vaporizing chamber.

2. Apparatus according to claim 1 in which the vaporizing chamber is fitted with alternate annular discs and rings.

GUSTAV A. BEISWENGER.